United States Patent [19]
Carbonnel et al.

[11] 4,017,426
[45] Apr. 12, 1977

[54] HIGHLY POROUS CONDUCTIVE CERAMICS AND A METHOD FOR THE PREPARATION OF SAME

[75] Inventors: Henri Carbonnel, Antony; Ludovic Hamon, Paris, both of France

[73] Assignee: Groupement Atomique Alsacienne Atlantique, Le Plessis Robinson, France

[22] Filed: Dec. 2, 1974

[21] Appl. No.: 529,420

Related U.S. Application Data

[63] Continuation of Ser. No. 317,562, Dec. 22, 1972, abandoned.

[30] Foreign Application Priority Data

Dec. 22, 1971 France ............................. 71.46212

[52] U.S. Cl. .................................. 252/520; 106/57; 106/69; 106/73.3
[51] Int. Cl.$^2$ ......................................... H01B 1/06
[58] Field of Search ...................... 252/520, 518 R; 106/73.3, 57, 69; 75/202

[56] References Cited

UNITED STATES PATENTS

| | | | |
|---|---|---|---|
| 3,215,545 | 11/1965 | Reidl et al. ................... | 106/73.3 X |
| 3,649,314 | 3/1972 | James ............................. | 106/57 X |
| 3,770,487 | 11/1973 | Gibson et al. .................. | 106/57 X |
| 3,775,138 | 11/1973 | Clougherty et al. ............ | 106/57 X |

*Primary Examiner*—Leland A. Sebaştian
*Assistant Examiner*—E. Suzanne Parr
*Attorney, Agent, or Firm*—Sughrue, Rothwell, Mion, Zinn & Macpeak

[57] ABSTRACT

Very porous conductive ceramic substances constituted of diborides and a certain percentage of disilicides of metals in groups IV$a$, V$a$, VI$a$ of the periodical classification of elements. Preparing of ceramic substances by sintering of fine powders and of grains of a mixture of diborides and disilicides of metals in groups IV$a$, V$a$, VI$a$ in the periodic classification of elements in presence of a fluoride.

2 Claims, No Drawings

HIGHLY POROUS CONDUCTIVE CERAMICS AND A METHOD FOR THE PREPARATION OF SAME

This is a continuation, application Ser. No. 317,562, filed 12/22/72 now abandoned.

BACKGROUND OF THE INVENTION

1. Field of the Invention

The present invention concerns very porous conductive ceramic substances and a method for the preparing thereof.

2. Description of the Prior Art

It is known that in numerous techniques, such as foundry operations, in which the flowing or treating of liquid metals is effected, the walls of the devices in contact with the liquid metal are generally made of a ceramic substance having the following characteristics:

Firstly, the ceramic substance must be passive, that is, it must not react with the liquid metal;

Moreover, that ceramic substance must be able to withstand great thermal shocks; it must therefore be porous;

Lastly, it must be difficult to oxidize.

The Applicant has sought to manufacture ceramic substances having the above-mentioned properties, as well as the property of transmitting easily the electric current to the molten metal, this entailing:

Fairly slight resistivity of the ceramic substance;

Good wetting of the ceramic substance by the liquid metal.

SUMMARY OF THE INVENTION

The Applicant has perfected a method enabling very porous conductive ceramic substances having the above-mentioned properties to be obtained, that method being characterised in that it comprises essentially the following operations:

Obtaining of a mixture of fine powder of diboride of a metal in groups IVa, Va, VIa, of the periodic classification of elements with a certain percentage of fine powder of disilicide of a metal in groups IVa, Va, VIa of the periodic classification of elements;

Addition to that mixture of a certain quantity of grains obtained by crushing after sintering at a high pressure and at a very high temperature, 1600° to 2000° C, of a mixture of fine powder of diboride and of a certain percentage of disilicide of a metal in groups IVa, Va, VIa in the periodic classification of elements;

Mulling of that mixture with 1 to 6% of a fluoride of a metal in groups IA, IB of the periodic classification of elements;

Subjecting of the mixture to vibrations in a mould for a very short time;

Sintering of the mixture while keeping it at a temperature in the order of 1000° to 1500° C for one or several hours in an atmosphere of an inert gas such as argon;

Cooling of the mixture.

DETAILED DESCRIPTION OF THE INVENTION

It is an advantage to mix a certain percentage (0 to 25%) of disilicide of a metal with diboride of a metal, for the mixture obtained is oxidized at a temperature substantially greater than that at which diboride of a metal alone begins to be oxidized.

By adding, to the mixture of fine powder of disilicide and diboride of a metal, crushed grains having a similar composition to that of the powders (the proportion of grains in the final mixture being about 20 to 80%), the resistivity of the ceramic substance obtained is reduced.

The diboride may, for example, be diboride of titanium, zirconium, hafnium or tungsten. The disilicide may be a disilicide of a same or different metal from that of the diboride.

The mixture of powders and grains is mulled with 1 to 6% of a fluoride, then subjected to vibration for a short time in a mould.

The fluorine ion acts, when heated, on the diboride and disilicide powders and grains, so that sintering may be effected at a lower temperature than usual without necessitating furthermore any sintering under charge. This sintering is effected in an atmosphere of inert gas. To avoid breaking the ceramic substance during cooling, the lower part of the mould is coated either with graphite felt or a graphite cardboard sheet commercialised under the trade name PAPYEX. Fluoride is no longer found in the ceramic substance obtained.

The following examples are given only by way of illustration and will make it easier to understand how the invention may be implemented.

EXAMPLE 1

A mixture of fine powders (each particle being a few $\mu$ in diameter) comprising 85 % of titanium diboride and 15 % of titanium disilicide has been used. That mixture becomes oxidized at 1250° C, in comparison with 600° C for titanium diboride.

60% of that mixture of powders was sintered under charge and at a very high temperature, 1800° C, so as to obtain a very dense product with almost no porosity. By crushing that product, grains a few mm in diameter which were added to the remaining 40% of the mixture of fine powders were obtained.

Then, that mixture was mulled with 3% of lithium fluoride, then subjected to vibration in a mould.

The mixture obtained by sintering has a porosity greater than 40%, this considerably improving the resistance to thermal shocks. For that purpose, the graphite mould and the mixture have been brought to 1350° C over a period of 2 hours in an argon atmosphere.

Ceramic substances comprising titanium diboride and disilicide obtained by the above-discribed method are good conductors of electricity, remain passive in the presence of liquid metal, enable good wetting, have great resistance to thermal shocks and begin to become oxidized only at a high temperature.

EXAMPLE 2

Another sample has been produced by that same method with hafnium diboride and lithium fluoride. As the hafnium diboride becomes oxidized at a high temperature, it was not necessary to add disilicide to the hafnium diboride powder.

65% of large grains of hafnium diboride previOusly sintered under charge at 2000° C were mixed with 35% of fine powder of that same substance.

96% of that mixture was then mixed with 4% of lithium fluoride, then that mixture was subjected to vibration in a graphite mould.

It was brought, in an argon atmosphere, to 1000° C for an hour, then, immediately after, to 1350° C for two hours.

The hafnium diboride ceramic substance obtained by the above-described method had a porosity of 30 to 35% according to the samples, and good mechanical resistance.

Although the method which has just been described appears to afford the greatest advantage for implementing the invention, it will be understood that various modifications may be made thereto without going beyond the scope of the invention, it being possible to replace certain operations of the method by other operations capable of ensuring the same or equivalent technical function therein.

The use of very porous conductive ceramic substances is a particular advantage in liquid metal pumps, in electrolysis devices, more particularly for forming electrodes, or even for producing direct heating pipe elements by the Joule effect easily.

What is claimed is:

1. A porous electrically conductive molded ceramic product comprising more than 20% but no more than 80% by weight of grains of a few millimeters in diameter comprising a diboride of one of, and of 0-25% of a disilicide of one of, the group of metals consisting of titanium, zirconium, hafnium, and tungsten, uniformly dispersed within less than 80% but no less than 20% by weight of a homogeneous sintered powder, said powder particles having a diameter of a few microns and comprising a mixture of a diboride of one of, and a disilicide of one of, the group of metals consisting of titanium, zirconium, hafnium and tungsten, said porous electrically conductive ceramic having a porosity greater than 30%.

2. The porous conductive ceramic product of claim 1, having a porosity of 35 to 40%.

* * * * *